Sept. 5, 1939.　　　J. B. BLACK ET AL　　　2,171,538
APPARATUS FOR INCINERATION OF GARBAGE AND REFUSE
Filed July 18, 1935　　　5 Sheets-Sheet 1

INVENTORS.
JOHN B. BLACK,
FRED DENIG
BY Henry Love Clarke
Their ATTORNEY.

Sept. 5, 1939. J. B. BLACK ET AL 2,171,538
APPARATUS FOR INCINERATION OF GARBAGE AND REFUSE
Filed July 18, 1935 5 Sheets-Sheet 2

INVENTORS.
JOHN B. BLACK,
FRED DENIG
BY Henry Love Clarke
their ATTORNEY.

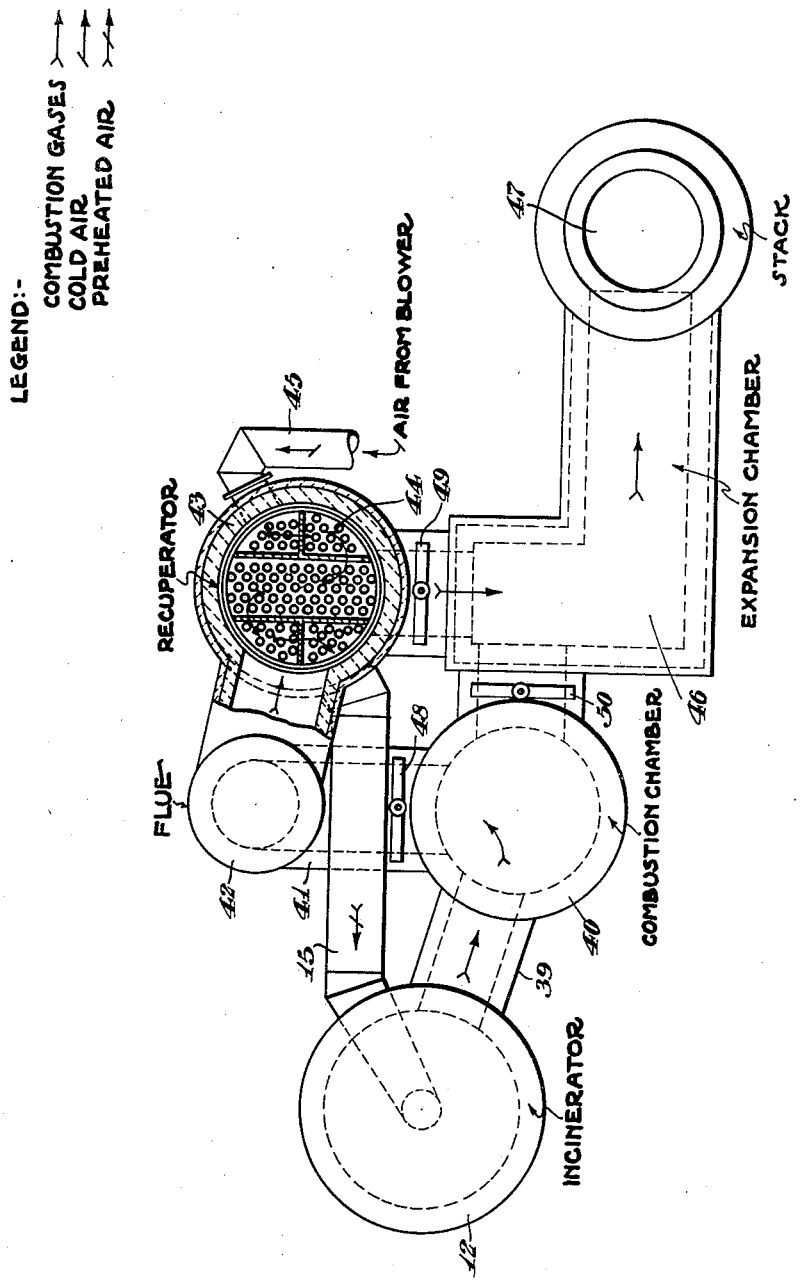

Sept. 5, 1939.    J. B. BLACK ET AL    2,171,538
APPARATUS FOR INCINERATION OF GARBAGE AND REFUSE
Filed July 18, 1935    5 Sheets-Sheet 4
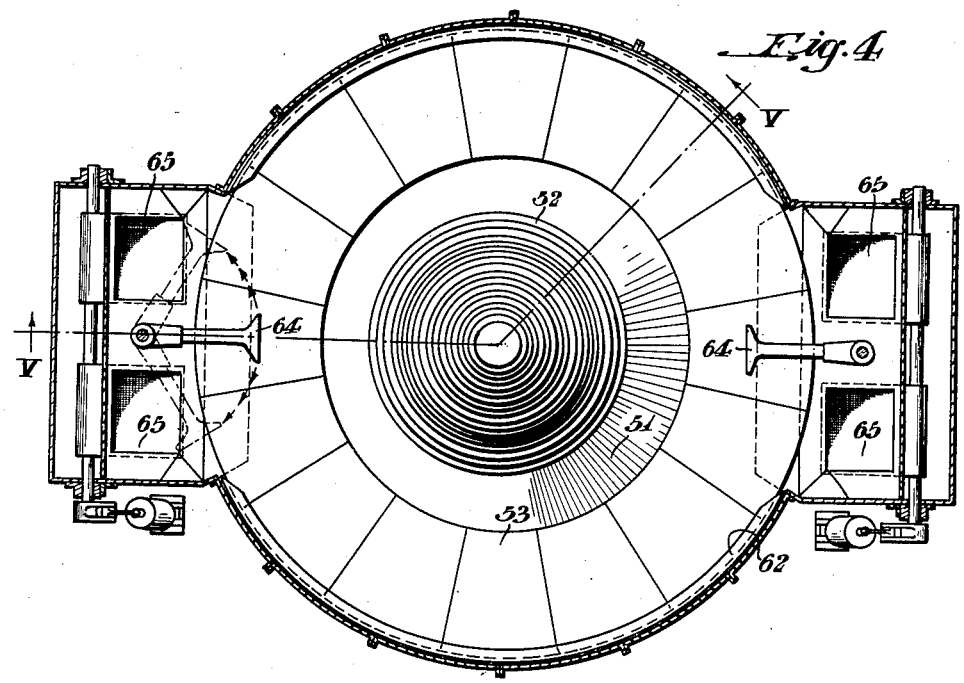
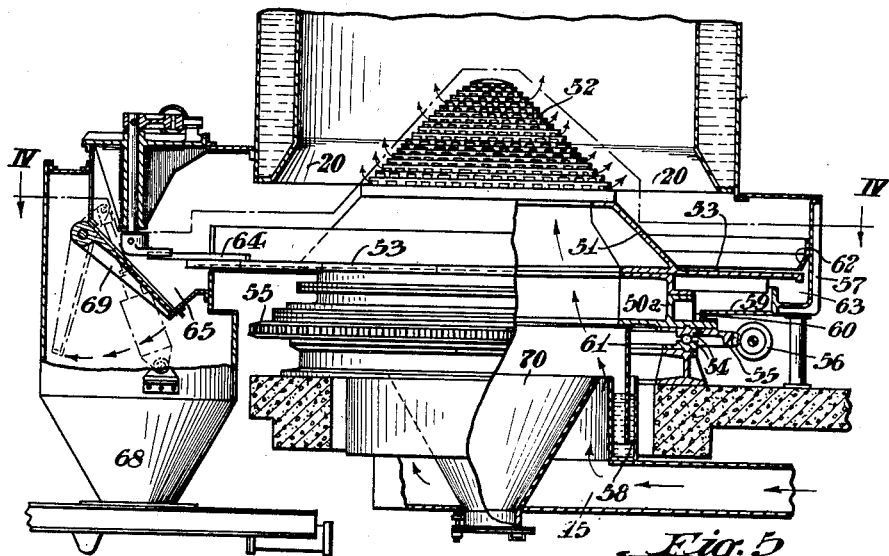
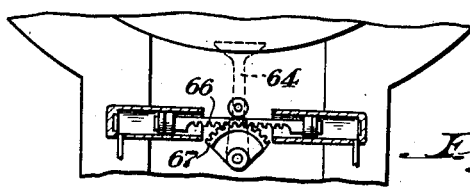
INVENTORS.
JOHN B. BLACK,
FRED DENIG.
BY Henry Love Clarke
their ATTORNEY.

Sept. 5, 1939.   J. B. BLACK ET AL   2,171,538
APPARATUS FOR INCINERATION OF GARBAGE AND REFUSE
Filed July 18, 1935   5 Sheets-Sheet 5
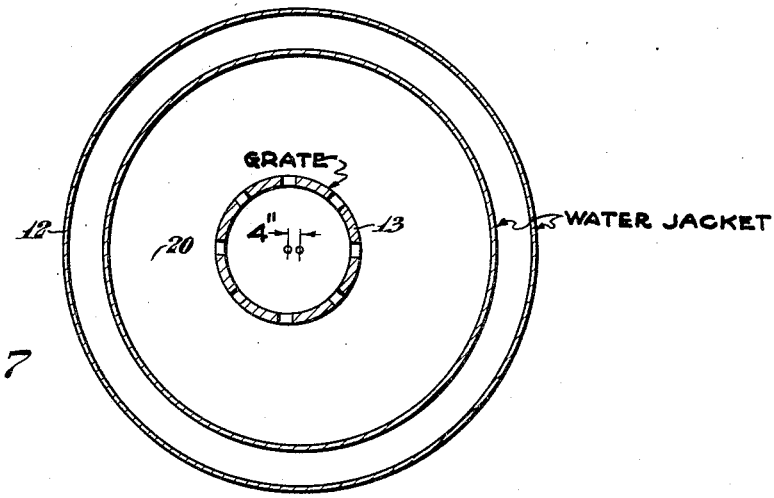
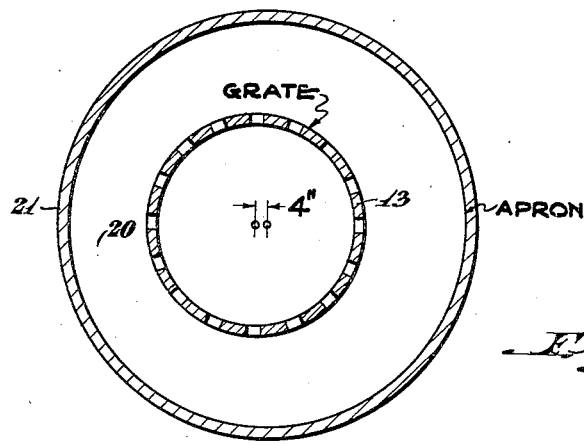
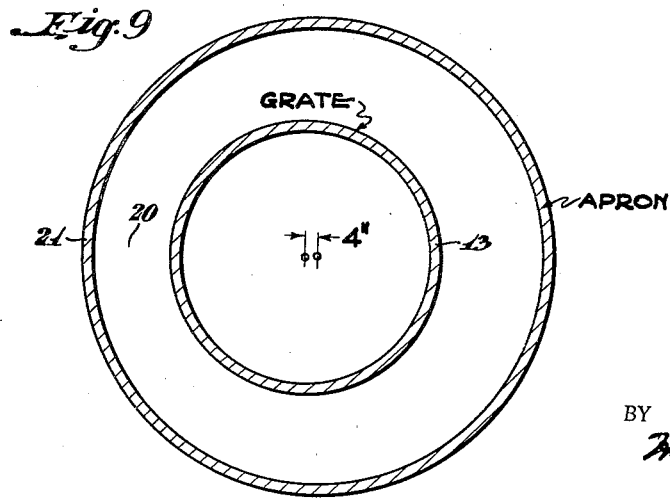
INVENTORS.
JOHN B. BLACK,
FRED DENIG.
BY Henry Love Clarke
their ATTORNEY.

Patented Sept. 5, 1939

2,171,538

UNITED STATES PATENT OFFICE 2,171,538

APPARATUS FOR INCINERATION OF GARBAGE AND REFUSE

John B. Black and Fred Denig, Pittsburgh, Pa., assignors, by mesne assignments, to Charles W. Nichols, Sr., New York, N. Y.

Application July 18, 1935, Serial No. 31,982

1 Claim. (Cl. 110—13)

The present invention relates to a new and useful apparatus and method for the incineration of carbonaceous refuse, and more particularly of the type which accumulates in civic and municipal life and comprises such diversified materials as animal and vegetable residues from kitchens, glass, cartons, cans, leather, carpets, ashes, leaves and the like, the destruction of the organic constituents of which and the sterilization of the non-combustible components by a burning process at elevated temperatures, is highly desirable for the maintenance of civic health and esthetic municipal surroundings.

The heterogeneous chemical nature of such refuse, its high inherent water content, lack of homogeneity in size and of uniformity in the distribution of its constituents, and the significant percentage of only partially combustible components, compound in admixture a product fluctuating in composition both with season and geographical position, which presents serious difficulties to the uniform and economical combustion of its carbonaceous constituents as well as the mechanical handling of the raw material and its combustion residues.

This invention has amongst its objects, the provision of an apparatus which will accommodate the miscellaneous composition and condition of refuse of the above described nature, in such manner as to necessitate a minimum of sorting and conditioning prior to its introduction into the combustion apparatus; will yield high temperatures in the products of combustion, thereby assuring that its end products are completely burned and their discharge into the atmosphere will create no obnoxious situation nor give rise to a civic nuisance; while the realization of the desired temperatures in the combustion products shall, as far as possible, be effected by the potential heat units inherent in the material itself, without augmentation from an external source; the apparatus shall also discharge its gases of combustion into the atmosphere substantially free of mechanically entrained or suspended solids.

Further objects of the present invention are the reduction to a minimum of the manual operations incident to the incineration process; that is, the apparatus shall be of such capacity that its charging opening will accommodate all objects of normal size appearing in the refuse without requiring any reduction of their dimensions, except in abnormal cases; the discharging of the incineration residues from the apparatus shall follow continuously and automatically without stoppages; continuous mechanical agitation of the incinerator bed shall promote even distribution of newly added charges of material over the same, eliminate blow-holes, unequal distribution of the combustion air and obviate clinker formation and the effects of segregated charging.

A still further object of the invention is to apportion the return of any recoverable heat units from the available heat produced by the burning of the raw refuse to points in the incineration apparatus where they may be most advantageously employed to modify factors tending to disturb the progress of a satisfactory combustion. Within our invention are included a device for preheating by means of the hot combustion gases the air participitating in the incineration, and a device for expediting the drying of fresh refuse entering the unit which enables it quickly to reach such temperature that its ignition starts soon after its introduction into the same, as will be hereinafter set forth. The recuperation and distribution of heat recovered from the combustion gases of a process for the incineration of refuse of this nature, has an important bearing upon the economics of the results obtained.

Our invention comprehends a new type of incinerating apparatus having an associated combustion chamber, heat recuperating device, expansion chamber, interconnecting flues which function to carry the gaseous combustion products to the various related elements of an installation and to discharge them into the stack and the atmosphere; means for introducing combustion air into the incinerator and means for by-passing certain of the associated units of the installation when desirable.

The incinerator results from a novel design of apparatus for disposing of the organic constituents of carbonaceous refuse by burning, and is an essential feature of the present invention. It comprises the following combination of functional innovations, a perforated conically shaped grate mounted concentrically or eccentrically on a rotatable ash-pan within which is spatially contained but out of contact with it, the apron-like extension of the vertical water jacketed fuel-bed retaining shell, which at its upper end flares outward to form a dome or mushroom shaped structure above the vertical sides of said retaining shell.

The manner of accomplishing the aforementioned objects or various other advantages accruing from our invention will be more clearly understood by reference to and consideration of the following drawings and the accompanying description of an exemplifying instance. In the drawings:

Figure 1 represents a vertical longitudinal section of a layout in which the various steps in the destruction of the organic constituents of municipal refuse, by the apparatus which is the subject of the present invention, are shown from the time the mixed refuse is received at the plant until the incombustible residues are removed and the burned gaseous products have been discharged into the atmosphere.

Figure 3 is a plan view of a plant layout in which the present invention may be practised, certain parts in section.

Figure 4 is a horizontal sectional view shown on the line IV—IV of Figure 5.

Figure 2:
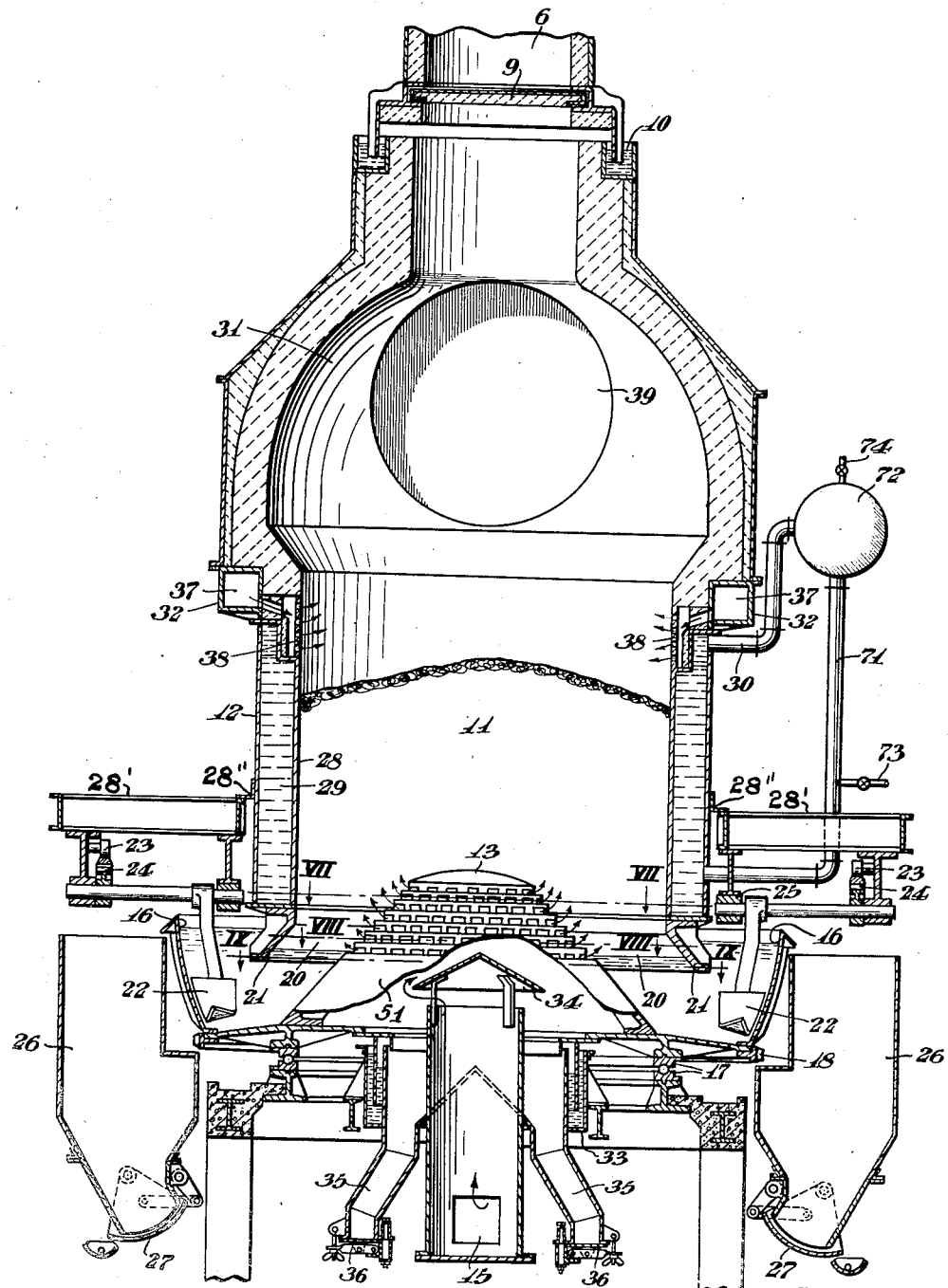
Figure 2 shows an enlarged vertical section of the incinerating apparatus along the line II—II of Figure 1, with details of the grate, residue pan of the wet seal type and the mechanical residue extractor.

Figure 5 is a vertical section on the line V—V of Figure 4 and shows an alternate type of grate which may be used in combination with the incinerating apparatus illustrated in Figure 2. This grate is of the dry seal type. The residue extractor used in such case is also shown.

Figure 6 is fragmentary plan view showing the actuating mechanism of the residue extractor, parts being in section.

Figures 7, 8 and 9 are horizontal sections on the lines VII—VII, VIII—VIII and IX—IX of Figure 2 and show the relatively large proportion of the cross-sectional area of the base of the incinerator which is provided at these points as a free-way space for the withdrawal of the incinerator residues.

The same characters of reference indicate the same parts throughout the several views.

Figure 1:
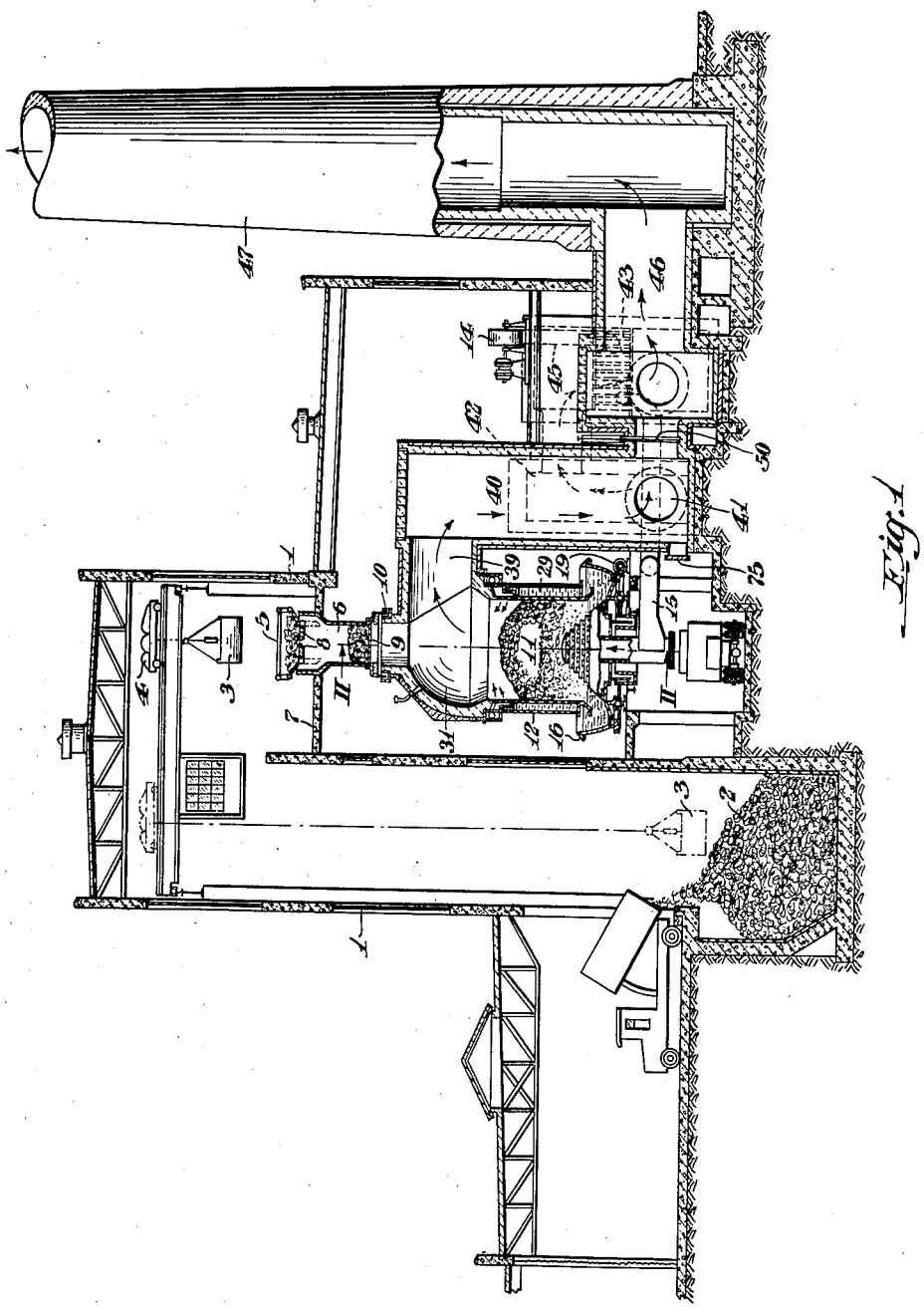

Referring to the drawings, in Figure 1 is shown the building 1 within which is housed the incineration installation that is an example of our invention. The mixed refuse upon arrival at the plant is dumped into the receiving hopper 2, from which it is transferred by means of grab-bucket 3 and travelling crane 4 to the picking table 5, situated at the upper end of the charging hopper 6. The charge of refuse, after being discharged from the grab-bucket onto the picking table, is inspected by workmen standing on the operating floor 7 for constituents contained therein, which may be too large to pass easily through the charging hopper. Such objects are removed to be reduced in size and then returned to the receiving hopper or are accorded special treatment outside the incinerator. Opportunity is also here afforded for the recovery of objects of value or removal of heavy metals, stones and the like which an incinerating process will but little change.

The upper charging gates 8 form the bottom of the picking table and are of such cross sectional area as to accommodate the passage of all objects of normal size present in refuse when they are opened, and will allow such material to fall onto the lower charging gates 9 of the charging hopper 6. Both sets of gates may be actuated pneumatically or hydraulically.

The charging hopper 6 is supported by the structural framework of the building and independently of the incinerator. A water seal 10 between the hopper and the incinerator prevents the escape of gases from the latter, permits the incinerator to expand freely in a vertical direction and also prevents the transmission of any operating shocks from the charging gates to the incinerator, thereby reducing any tendency that would otherwise exist to loosen the brickwork in the incinerator dome.

Upon opening the lower charging gates 9 of the hopper 6, the charge of refuse contained therein falls onto the top of the burning refuse bed 11. This newly added material has ordinarily a high moisture content, which must be removed before ignition will take place and combustion satisfactorily proceed.

In our invention, provision is made for this contingency by flaring the upper portion of the walls of the incinerator outward in such manner as to form, above the fuel-bed, a dome-like structure which is lined with a refractory material of high heat capacity and large surface area, which retains heat absorbed from the hot combustion gases as they flow from the incinerator, and by radiation returns this heat to the top of the fuel-bed, thereby tending to increase the rate of drying and burning of the newly charged refuse.

As combustion proceeds and the combustible constituents are removed from the refuse contained in the stationary incinerator shell 12, the non-combustible constituents such as cans, glass, ashes, etc., are accumulating in the lower sections of the burning refuse bed and in the vicinity of the revolving and conically shaped grate 13, which is perforated and through which perforations the combustion air, is forced by means of blower 14 and pipe 15 into the refuse bed.

The grate 13 shown in Figure 2 is assembled on an ash-pan 16 which is supported on a ball race 17. The ash-pan contains water which functions to seal the incinerator shell from the atmosphere. The grate and ash-pan form a unit which is rotated by a worm gear 18, actuated by a motor 19.

As the non-combustible residues of the refuse accumulate near the grate 13 at the bottom of the fuel-bed, they are forced by the mass of the deep refuse bed above, through the opening 20, under the water-seal and into the ash-pan 16.

At the lower end of the incinerator shell is attached an apron 21 which dips, at an angle substantially parallel with that of the inclined plane of the conical grate into the water contained in the ash-pan thereby sealing the incinerator chamber, and preventing the escape of air entering the incinerator through the perforations of said grate; and further functions as a guide to force the discharging non-combustible residues to assume an inclination equal to or somewhat greater than the angle of repose of the residue material, which then easily flows downward into the ash-pan from the incineration chamber, assisted by the rotary movement of the grate.

The relative size of the opening 20 as well as the design and contour of the grate 13 and apron 21 constitute important features in our invention, upon which depends an uninterrupted and facile discharge of the incineration residues from the incinerating chamber into the ash-pan.

We preferably mount the grate on the ash-pan eccentrically so that as the ash-pan rotates the fuel-bed is constantly agitated. This rotary movement tends to level the top of the bed, prevents arching of any clinkered residues and keeps the clinker sizes to such dimensions that they pass easily through the opening 20 without stoppage.

As the incineration residues collect in all parts of the ash-pan, they are brought into contact as the pan rotates about its axis, with an oscillating residue extractor 22, which is actuated by suitable movement of a gear segment 23 and rack 24 to describe a semicircular arc within the bushing 25. With each downward movement of the extractor, a portion of the collected residue is raised by its following upward movement and allowed to flow over the edge of the pan into the residue receivers 26, from which it may be discharged through the gates 27 and disposed of as preferred.

The vertical walls 28 of the incinerator shell are stationary and supported rigidly by the structural steel of the foundations, schematically indicated at 28' and 28'', and independently of the ash-pan. That part of the shell in contact with the fuel-bed is made of metal and is surrounded by a water-jacket 29 which functions as a boiler to produce steam. The water-jacket may be connected, if preferred, by means of pipes 30 and 71 with a small steam drum as 72 wherein a thermosiphon circulation is maintained; the hot water will, in such case rise through pipe 30 and return to the jacket through pipe 71. Make-up water may be added to the water-jacket at some point in the line 71, as for example at 73. The steam developed may be allowed to flow through valve 74 to any desired point. We however do not intend to limit ourselves to such means for utilizing the steam developed, and if preferred, it may be led directly from the jacket through pipe 30 to the point of application. The water in the jacket may be maintained at any desired temperature but preferably above the dew point of the gases passing through the incinerator, and at a point cool enough to prevent any clinker formation against the walls.

The dome-shaped portion 31 of the incinerator above the jacketed vertical walls is lined with refractory materials; and because of its diameter, which is larger than that of the incinerator proper, it is possible to carry the weight of this upper portion with its brickwork, independently of the water-jacket by a special construction as at 32, thereby relieving the jacket of the load. Such construction may comprise a supporting beam construction outside the jacket walls 28 and formed separately of the water jacket and supported rigidly by the structural steel of the foundations by means of uprights (not shown) independently of the water jacket and of the ash pan.

As forementioned, combustion air is introduced under the grate from a blower through pipe 15 at several inches of pressure. To enable the grate to rotate about this delivery pipe, a water seal is provided between the grate and the pipe 15 at 33, in which a blast seal-apron attached to the grate-ash-pan assembly is immersed.

The open end of the air delivery pipe is covered by a shield 34 to prevent the accumulation of any fine material therein which may descend through the grate perforations. This shield is in the shape of a deflector which diverts such material into the pockets 35, from which it may be simply removed by opening the retaining covers 36 as shown.

The partially burned combustion products which leave the top of the fuel-bed 11 may contain insufficient oxygen to facilitate a rapid completion of their combustion and we, therefore, prefer to introduce into the combustion products at this point, additional air by means of the supporting beam construction 32 constituted as a bustle-pipe 37 and the perforated furnace blocks 38. Introduction of such air is advantageous, in that the temperature of the gases leaving the fuel-bed will be raised above a point that otherwise would obtain and has a tendency to concentrate their so-liberated heat at or near the surface of the fuel-bed, where it is effective in promoting the drying of freshly charged material as it passes through this zone or lies on the fuelbed surface adjacent.

The combustion products flow from the incinerator 12 through the refractory lined communicating connection 39, as indicated by the arrows in Figures 1 and 3, into the combustion chamber 40 where secondary combustion further progresses, and thence from the bottom of 40 by pipe 41 into flue 42. Fly ash deposited by the incinerator gases in the combustion chamber may be periodically removed through the door 75 provided therefor.

From the top of flue 42, the hot gases assume a downward path of flow into the recuperator 43, where in passing through the tubes in the tubebank 44 they come into indirect contact with cold air flowing around the tubes from the pipe 45. As the combustion gases pass down the inside of the tubes, they preheat the cold air flowing in the direction indicated by the arrows around their outside. Leaving the bottom of the recuperator, the cooled combustion gases flow into the expansion chamber 46 where their velocity is somewhat reduced, thus affording opportunity for suspended solids to precipitate. From the expansion chamber the combustion gases flow directly to the stack 47 whence they discharge into the atmosphere.

The now heated air after leaving the recuperator 43 flows through pipe 15 under the grate 13 and through the perforations therein into the fuel-bed 11 to participate in the combustion process.

By closing valves 48, 49 and opening valve 50, the flue and recuperator 42, 43 can be removed from the gas-flow system and the combustion gases can pass directly from the combustion chamber to the expansion chamber and the stack. This possibility proves of advantage when the available heat produced by the burning of refuse, at any particular season or in any locality, is sufficient to produce a rapid and complete combustion with temperatures sufficiently high to obviate the discharge of malodorous products into the atmosphere, without preheating of the air introduced beneath the incinerator grate.

In our invention a substantial portion of the heat that is retained by the non-combustible constituents of the refuse, after they have passed through the burning zone, is recovered and returned to the process. As these hot non-combustibles emerge from the actual burning zone, they lie at the bottom of the fuel-bed adjacent to the grate. The combustion air having been somewhat preheated in the recuperating stage is blown, as aforedescribed, through the perforations in the rotating grate, where it is finely divided and distributed through the refuse bed above. Before entering the actual combustion zone, this somewhat preheated air passes through the layer of hot non-combustible residues adjacent the grate, absorbing some of their heat content, thereby increasing the temperature to which the air is preheated. The resultant cooling of the residues, in this manner, while the grate is in motion, has a tendency to decrease clinker formation and the intimate contacting of the combustion air and the hot residues before the latter are discharged from the incinerator, gives the apparatus a high efficiency in its conservation, for the incinerating process, of the available heat content in the raw refuse.

In the aforedescribed embodiment of our invention, the incinerator is closed at its base by a water-seal held in the associated ash-pan. As the non-combustible residues flow under the walls of the incinerator into the external portion of the pan they, therefore, pass through a water-seal where their remaining heat is absorbed by the water, which is thus vaporized and passes in the form of steam upwards along the grate perforations to assist in preventing overheating of the grate surface as well as to reduce any tendency to clinker formation on the same.

Our invention is, however, not limited to the use of a grate of the water-sealed type but may employ instead a grate having a dry seal, as shown in Figures 4 and 5, in which arrangement the seal is formed by the pressure of the combustion air reacting upon a flexible metal plate as is hereinafter described by reference to the abovementioned figures. Upon the grate support 50a is mounted a grate pedestal 51 which in turn supports a conical and perforated grate 52. On the upper side of the grate support a circular metal ash-plate 53 is made fast. The support, pedestal, grate and ash-plate are all assembled as a unit which is mounted on a ball-race 54. This unit is rotated by a worm gear 55 actuated by any suitable means as at 56.

The entire assembly rotates within a gas-tight housing comprising, the shell 57 attached to the incinerator shell at its lower end, blast-seal 58, the flexible metal plate 59 and the knife edge 60. As the assembled unit is rotated about its axis by the gears 55, the perforated grate moves preferably eccentrically, the ash-plate 53 concentrically and the blast seal-apron 61 is free to revolve in the blast seal 58.

Refuse charged onto the grate is burned with air forced by blower 14 through the pipe 15, which then flows upwards, as shown by the arrows in Figure 5, through the perforations of the grate and into the refuse charge. As combustion progresses, the non-combustible residues flow through the opening 20 and collect on the metal ash-plate 53. The bent iron shield 62 is attached to the grate housing at its upper end and extends downward toward ash-plate 53 but does not come into actual contact with it, sufficient space remaining between the two to permit the pressure of the blast air to be exerted on the flexible plate 59 and force it against the knife edge 60. Any communication between the interior of the grate housing and the atmosphere is thereby closed. This seal is sufficient to prevent the escape of any combustion air but does not interfere with facile rotation of the grate about its axis on the bearing race. The opening between the iron shield 62 and the ash-plate 53 is sufficient to permit the pressure of the blast air to reach the flexible plate 59, while still retaining on the ash-plate the incinerator residues discharged upon it through the passage 20. Such finely divided material as does find its way through said opening and becomes lodged in the channel 63, is intermittently flushed out with a jet of water.

The residues from the incineration process which accumulate on the ash-plate 53 are carried by its rotary movement to a position adjacent the oscillating residue sweeper arm 64, which is actuated, as shown by the arrows in Figures 4 and 6, to move across the surface of the ash-plate and to direct with each stroke a portion of such residues into one of the hoppers 65. The sweeper arm may be actuated, as illustrated in Figure 6, by hydraulic or pneumatic pistons, which translate their motion to a ratchet bar 66 and gear segment 67 to which the arm is attached.

Provision is made to close the communicating openings between the hoppers 65 and the collecting hoppers 68 by the doors 69, which prevents the loss of blast air during those periods when the collecting hoppers are being discharged by opening a valve situated at the apex of their conical bottom.

The hopper 70 serves for the retention and discharge of such finely divided material as falls, during operation, from the refuse bed through the grate perforations.

In the actual operation of our invention for incinerating refuse we have found that when using a refuse bed retaining shell approximately 10 feet in diameter, it was possible to burn a normal city refuse comprising a mixture of garbage and rubbish which contained from 35 to 55% of moisture, at a rate of approximately 7 tons per hour. Combustion proceeded without difficulty and required from 80 to 100 M cu. ft. of air per ton to properly sustain it, depending upon the chemical nature of the material being treated. The waste gases of the combustion contained 14–16% carbon dioxide, were not smoky even within the incinerator shell, and their temperature ranged from 1600–2000° F. in the flues. A temperature of at least 1400° F. in the presence of sufficient oxygen to permit complete combustion, is required to effectually destroy malodorous organic derivatives which may be contained in such waste gases. The combustion residues, which fuse to a clinker because of the high degree to which the combustion heat is localized and also assisted by the weight of the deep bed of residue maintained in the incinerator in our method of destruction, are broken up by the grate as it rotates and are easily and automatically removed. The appearance in the bed occasionally of large clinker blocks which are shifted around inside the shell by the motion of the grate, thereby contribute to the general disintegration of the cans and ash before the clinker is itself eventually reduced to such dimensions by the crushing action of the grate, that it passes onto the ash-pan or plate and is discharged. The combustible matter left in such residue was 1% or less, and about 0.4 lb. of water per lb. of refuse was evaporated from the jacket of the shell.

An important feature of our invention is the large and inclined discharge free-way provided between the conical grate and the conical shell apron for the passing of the incinerator residues from the interior of the incinerator to an outside point where they may be easily removed from contact with the bed. In consideration of the heterogeneous nature of the non-combustibles which are present in the refuse, their possible size and shape and the changes in physical form they may undergo resulting from the mechanical action of the rotary grate, it becomes of great importance in the handling of such materials that a discharge orifice of larger extent is required than in those instances where the combustion residues are known to be of smaller and less assorted nature. For example, flattened cans may become entangled with wire and fused into clinkers, forming clusters difficult to disintegrate, which an opening of substantial size would allow to flow freely through. Consequently, in our present invention we have assigned a relatively large proportion of the horizontal area of the incinerator shell base to a discharge passageway.

As before mentioned, not only is an adequate passageway between the grate and the incinerator wall of great expediency in assuring uninterrupted operation of our invention, but the angle it assumes on approaching the discharge orifice is of similar importance. If the vertical, and likewise the horizontal, is too nearly approached, the mass of the residues and the bed above will tend to wedge and compress the said residues into the passageway and against the grate or its mounting beneath, and in such manner as to inhibit a free flowing through the passage. Therefore, in our invention, in combination with a discharge free way of large proportions in relation to the total horizontal area of the base of the shell, we prefer a steeply sloping discharge passage, which will promote a lateral movement of the residues in the direction of the periphery of the grate-pan or plate, which movement will then be augmented by the mass of the bed above and the grate motion.

In the accompanying Figures 7, 8 and 9 are shown the comparative areas at the base of the incinerator given to the grate and the passageway at different horizontal levels along said passage in one exemplification of our invention. In Figure 7, the free way area is approximately 8 times the horizontal grate area; in Figure 8, the free way is 2.3 times the area occupied by the grate and at the lowest point of the apron, where the residues are passed outside the incinerator wall, the area of the free way is 1.7 times the grate area.

From the aforegiven description of our apparatus it is obvious to those skilled in the art of refuse incineration that the subject of our invention offers many advantages over those previously employed for this purpose.

We have developed an apparatus that is labor saving and by reason of the fact that the combustion zone is never directly exposed to the atmosphere, not only conserves the available heat in the refuse to effect its own destruction but preserves the apparatus structure itself. The dimensions of the apparatus are such as permit a charging opening of sufficient magnitude to allow the introduction of all objects of normal size which appear in municipal refuse, without preliminary treatment.

Continuous charging and continuous, automatic withdrawing of the residues contribute to the maintenance of uniform operating temperatures within the incinerator, which is of import not only to the efficiency of the actual destruction process, but also in those cases where it is desired to use the available heat in the waste gases for the generation of steam.

The subject of our invention permits operation with a deep fuel-bed that has a high capacity for the storage of heat, which reduces significantly any deleterious effect minor fluctuations in the nature of the raw material or in operating conditions would otherwise exert on uniform continuity of operation. Continuous rotation of the grate effects constant agitation and change of position of the material and objects in the fuel-bed, to promote drying of the new portion of the charge, even distribution, and elimination of any tendency for the formation of 'chimneys' which result in poor distribution of the combustion air to the charge. Furthermore, in the design of our invention, the actual weight of the mass of the deep fuel-bed is used to assist in the elimination of the non-combustible residues from the process. The configuration of the grate and the shell apron have been so planned that the residues ready to be discharged from the apparatus are assembled in a discharge passage between the grate and the apron, wherein they are sustained by the grate at an average angle equal to or greater than the angle of repose of the residues of municipal composite-refuse. The angularity of the grate surface to the horizontal is also such that the effective load of the fuel-bed above is resolved into a lateral component force of sufficient magnitude to augment the eccentric motion of the grate to advance the residues beneath the shell wall and into the ash-pan, whence they are automatically extracted by aforedescribed means. The angularity of the grate surface, its rotation and position on the ash-pan and the angle at which the residues are supported within the incinerator are, thus, effective factors in determining its operating success and comprise important features of our improvement in apparatus designed for this purpose.

The dome-like structure forming the top of the incinerator chamber is of such shape in relation to the normal contours of the fuel-bed that the heat radiated onto the fuel-bed therefrom is well distributed over the surface and is effective in promoting rapid drying of moist freshly added charges which lie on the surface. This device serves not only to retain heat within the incinerating chamber which would otherwise be carried out with the waste gases but also directs its return to a point within the same where it is of special advantage in promoting celerity of combustion. Drying of fresh charges added to the surface of the fuel-bed is further assisted by introducing air for the secondary combustion immediately above the surface of the bed. Partially burned gases leaving its surface are thereby furnished sufficient air to complete their combustion and the heat so evolved is retained within a smaller space than would otherwise obtain and as a result produces higher combustion temperatures at a point where they are especially efficacious in promoting a rapid drying of the moist new charge atop the bed. This is a decided advantage toward maintaining uniform conditions of combustion.

The invention as hereinabove set forth is embodied in particular form and manner but may be variously embodied within the scope of the claim hereinafter made.

We claim:

In an incinerator apparatus for garbage, rubbish, sludge or the like, and mixtures thereof, in combination: a lower jacket shell for indirect cooling of a fuel bed incinerator chamber surmounted by an upper gas off-flow chamber; a coaxial ash pan beneath the shell with a conical grate comprising an imperforated pedestal with a superimposed perforate air diffusion conical grid, the grate being disposed inside the shell and the ash pan extending outside the shell to form an outer annular ash trough peripherally around the lower part of the shell; a stationary pendant apron at the lower end of the shell extending into the ash pan from a level above the level of the top of the pedestal, both the pendant apron and the outer margins of the imperforate pedestal being outwardly inclined substantially parallel to each other and at substantially the same angle of inclination as the angle of inclination of the inclined margin of the perforate conical diffusion grid with the base of the outer inclined margin of the pedestal terminating substantially within the region of the vertical plane of the jacket of the shell and the base of the apron terminating at a level at least as low as the level of the top of the pedestal but above the level of the base of the pedestal and ash trough to provide an annular ash crushing channel that is also outwardly inclined between the pedestal and the apron and is at an angle of inclination substantially the same as the angle of the inclined margins of the conical diffusion grid substantially continuously from the apex of the conical grate to the terminus of the ash channel in the ash trough, and of substantially constant cross-sectional area from a level inside the shell above the top of the pedestal to a point in the ash trough beyond the base of the pedestal; a gas-tight seal for the ash pan; an air-blast pipe beneath the grate; means for discharging ash from the ash pan; and stack draft outlet means for withdrawing and discharging products of combustion from the gas off-flow chamber.

JOHN B. BLACK.
FRED DENIG.